United States Patent [19]

Farkas

[11] Patent Number: 5,422,385

[45] Date of Patent: Jun. 6, 1995

[54] ISOCYANATE-BASED ELASTOMER AND PROCESS FOR PRODUCTION THEREOF

[75] Inventor: Paul V. Farkas, Willowdale, Canada

[73] Assignee: Woodbridge Foam Corporation, Canada

[21] Appl. No.: 122,657

[22] Filed: Sep. 17, 1993

Related U.S. Application Data

[63] Continuation-in-part of Ser. No. 74,966, Jun. 11, 1993, which is a continuation-in-part of Ser. No. 7,991, Jan. 22, 1993, abandoned.

[51] Int. Cl.$^6$ ............................................. C08K 9/12
[52] U.S. Cl. ....................... 523/211; 521/49; 428/903.3; 525/452; 525/457; 525/458
[58] Field of Search .............. 521/49, 452; 525/457, 525/458; 524/871; 428/903.3; 523/211

[56] References Cited

U.S. PATENT DOCUMENTS

| | | | |
|---|---|---|---|
| 3,114,722 | 12/1953 | Einhorn et al. | 521/99 |
| 3,136,731 | 6/1954 | Piechota et al. | 260/2.5 |
| 4,105,594 | 8/1978 | Dieterich et al. | 521/100 |
| 4,124,518 | 11/1978 | Stone et al. | 252/91 |
| 4,193,887 | 3/1980 | Stone et al. | 252/91 |
| 4,226,944 | 10/1980 | Stone et al. | 521/76 |
| 4,293,470 | 10/1981 | Cuscurida | 260/45.9 R |
| 4,385,131 | 5/1983 | Fracalossi et al. | 521/55 |
| 4,438,221 | 3/1984 | Fracalossi et al. | 521/55 |
| 4,452,920 | 6/1984 | Joubert | 521/109.1 |
| 4,507,410 | 3/1985 | Falardeau et al. | 523/211 |
| 4,515,646 | 5/1985 | Walker et al. | 156/78 |
| 4,518,778 | 5/1985 | Cuscurida | 544/398 |
| 4,576,718 | 3/1986 | Reischl et al. | 210/616 |
| 4,596,725 | 6/1986 | Kluth et al. | 427/385.5 |
| 4,695,619 | 9/1987 | Hamermesh et al. | 528/73 |
| 4,734,439 | 3/1988 | Reischl | 521/54 |
| 4,760,099 | 6/1988 | Canaday et al. | 521/110 |
| 4,795,763 | 1/1989 | Gluck et al. | 521/99 |
| 4,801,621 | 1/1989 | Reischl | 521/53 |
| 4,843,105 | 6/1989 | Reischl et al. | 521/54 |
| 4,876,291 | 10/1989 | Dallavia, Jr. et al. | 521/124 |
| 4,916,173 | 4/1990 | Otloski et al. | 523/219 |
| 5,034,222 | 7/1991 | Kellett et al. | 424/76.4 |
| 5,055,339 | 10/1991 | Eder et al. | 428/157 |
| 5,079,276 | 1/1992 | Kumasaka et al. | 521/170 |
| 5,177,117 | 1/1993 | Coe et al. | 521/117 |
| 5,254,405 | 10/1993 | Panaroni et al. | 524/507 |

FOREIGN PATENT DOCUMENTS

| | | | |
|---|---|---|---|
| 0396092 | 11/1990 | European Pat. Off. | C08G 18/18 |
| 2312666 | 9/1974 | Germany . | |
| WO9212196 | 7/1992 | Germany | C08J 9/12 |

OTHER PUBLICATIONS

Encyclopedia of Polymer Science; vol. 13, 1988; John Wiley & Sons, p. 255.

"Dynamic Mixer With Metered Dry Filler Feed Capability", D. Ramazzotti, 33rd Annual Polyurethane Technical/Marketing Conference (Sep. 30–Oct. 3, 1990) (pp. 125–128).

Primary Examiner—John Kight, III
Assistant Examiner—R. F. Johnson
Attorney, Agent, or Firm—Fitzpatrick, Cella, Harper & Scinto

[57] ABSTRACT

An isocyanate-based elastomer containing a filler material, the filler material being present at a level in the range of from about 30% to about 90% by weight of the elastomer and having a specific gravity of less than about 2.0. A process for producing the isocyanate-based elastomer is also disclosed. The process comprises the steps of: providing a first mixture comprising a catalyst and a filler material, the filler material being wetted by the catalyst; providing a second mixture comprising an isocyanate and an active hydrogen-containing compound; mixing the first mixture and the second mixture to provide a reaction mixture; allowing the reaction mixture to react to produce the isocyanate-based elastomer.

13 Claims, No Drawings

ISOCYANATE-BASED ELASTOMER AND PROCESS FOR PRODUCTION THEREOF

CROSS-REFERENCE TO RELATED APPLICATIONS

This application is a continuation-in-part of application Ser. No. 08/074,966, filed Jun. 11, 1993 which is a continuation-in-part of application Ser. No. 08/007,991, filed Jan. 22, 1993 and now abandoned.

BACKGROUND OF THE INVENTION

1. Field of the Invention

The present invention relates to an elastomer and to a process for production thereof. More particularly, the present invention relates to an isocyanate-based (e.g. polyurethane, polyurea, polyisocyanurate, etc.) elastomer and to a process for production thereof.

2. Description of the Prior Art

Isocyanate-based elastomers are known in the art. Generally, those of skill in the art understand isocyanate-based elastomers to be polyurethanes, polyureas, polyisocyanurates and mixtures thereof.

It is also known in the art to produce isocyanate-based elastomers using various techniques. Indeed, one of the advantages of isocyanate-based elastomers compared to other elastomer systems is that polymerization can be controlled to a degree sufficient to enable molding of the elastomer while it is forming.

One of the conventional ways to produce a polyurethane elastomer is known as the "one-shot" technique. In this technique, the isocyanate, a suitable polyol, a catalyst and other additives are mixed together at once using, for example, an impingement mixer. Generally, if one were to produce a polyurea elastomer, the polyol would be replaced with a suitable polyamine. A polyisocyanurate elastomer may result from cyclotrimerization of the isocyanate component. Urethane-modified polyurea or polyisocyanurate elastomers are known in the art. In either scenario, the reactants would be intimately mixed very quickly using a suitable mixer.

Another technique for producing isocyanate-based elastomers is known as the "prepolymer" technique. In this technique, a prepolymer of polyol and isocyanate (in the case of a polyurethane) are reacted in an inert atmosphere to form a liquid polymer (i.e. a prepolymer) terminated with isocyanate groups. To produce the elastomer, the prepolymer is thoroughly mixed with a lower molecular weight polyol or other active hydrogen-containing compound.

Regardless of the technique used, it is known in the art to include a filler material in the reaction mixture. Conventionally, filler materials have been introduced into elastomers by loading the filler material into one or both of the liquid isocyanate and the liquid active hydrogen-containing compound (i.e. the polyol in the case of polyurethane, the polyamine in the case of polyurea, etc.).

The nature and relative amounts of filler materials used in the reaction mixture can vary, to a certain extent, depending on the desired physical properties of the elastomer product, and limitations imposed by mixing techniques, the stability of the system and equipment imposed limitations (e.g. due to the particle size of the filler material being incompatible with narrow passages, orifices and the like of the equipment).

Typically, when it is desired to load the elastomer with a filler material, there are limitations on the process resulting from the increase in the viscosity of the reaction mixture as polymerization proceeds. Additional limitations result from the difficulties encountered in achieving substantially complete wetting-out of filler materials in the case where all ingredients of the reaction mixture (including the filler material) are mixed in one step in a suitable mix head (i.e. the "one-shot" technique).

A particular difficulty is encountered in the situation where the nature and surface structure of the filler material renders it selectively compatible with some but not all of the ingredients in the reaction mixture. The result of this is that, regardless of whether adequate mixing of ingredients is achieved, there is an imbalance in the physical allocation of the filler material in the elastomer product with the filler material essentially agglomerating. This results in non-uniform physical properties in the product. A secondary effect is the relative (and localized) withdrawal of one or more components of the homogeneous, liquid reactant system which may cause catastrophic elastomer property alterations. While, equipment modifications are useful to mitigate one or more of these problems, there is still a need to facilitate addition of the filler material to the reaction mixture with a view to further mitigating or even eliminating one or more of the problems. Specifically, it is known to add one additional stream to the process with a view to separating the filler material from other components in the reaction system which cannot tolerate the filler material. For example, this may be done by having a dispersion of the filler material and the active hydrogen-containing compound (the majority or all) separated from the amine-based extenders and other components used in the reaction system.

When a filler material is added to any reaction mixture used to produce an isocyanate-based elastomer, it is desirable during the process to achieve both (i) uniform distribution of the filler material throughout the elastomer matrix, and (ii) intimate contact (both chemical and physical) between the filler material, and the isocyanate and active hydrogen-containing compound. The result of not achieving both (i) and (ii) above can cause uncontrolled physical property variations in the resulting elastomer product due to an uneven distribution of the filler material. This is particularly a problem in the case when the individual particles of filler material are not separated from each other and the resulting product contains lumps of either "dry" or "wetted" and agglomerated filler material particles. Moreover, in the prior art processes, as the loading of filler material has been increased, the surface quality of the resulting product has deteriorated. Specifically, since the filler material is "foreign" to the reactive system, it has a tendency to be "washed out" to the surface of the finished product.

Attempts have been made to overcome these problems by addition of the filler material to the reaction mixture in specially designed low pressure mixing heads. These mixing heads essentially endeavour to achieve both (i) and (ii) in a single step. While these mixing heads provide for adequate mixing of the filler material and the reaction mixture, it is not typically possible to obtain high loadings of filler material due to the fact that, at increased loadings of the filler material, the mixing heads do not provide uniform distribution of the filler material simultaneously with the required intimate mixing (at the molecular level) of the main chemical reactants. The reason for this is that as the polycondensation reaction proceeds, the viscosity of the reaction mixture increases resulting very rapidly in a reduction in the ability to achieve (i) and (ii) above. Practically, this translates into an inability to achieve filler loading levels (using filler materials having a relatively low specific gravity) of greater than about 17–30% by weight of the elastomer reaction mixture without adversely affecting the physical properties of the final elastomer product. Furthermore, if the efficiency of mixing the reactants and filler material is insufficient, a separation effect of the filler material (by particle size) is likely to occur resulting in an uneven particle size distribution in the cross-section of the elastomer mass.

Other attempts to overcome these difficulties include the use of high pressure mixheads. Specifically, the filler material stream (especially if the filler material is a similar chemical nature as the finished isocyanate-based elastomer) is separated from the active hydrogen-containing compound stream in order to overcome selective absorption of some chemical components into the filler material from the active hydrogen-containing compound stream. It has been reported that this technique may be used to achieve a filler material loading level up to 30% by weight of the final product using a dispersion of filler material (particle size up to about 200 $\mu$m) having a relatively low specific gravity (e.g. recycled materials such as post-user and post-consumer goods).

Regardless of the mixing technique used, it is known generally in the art to produce isocyanate-based elastomers by either: (i) pouring the reaction system into an open mold (also referred to as "cast technology"); or (ii) injecting the reaction system into a closed mold (also referred to as "Reaction Injection Molding technology" (RIM) or "Reinforced Reaction Injection Molding technology" (RRIM)). These molding techniques combine the reactive properties of the mixed components with the mold conferred shape retention of the mold cavities used for finishing the chemical reactions.

Obvious flow-related limitations (e.g. mold-created back pressure, time/temperature viscosity function, etc.) exist in RIM technology, and part thickness and surface area are dependent on both the reactivity the components used in the system and the performance of the equipment. Further, it is believed that it may be necessary to modify at least a portion of the surface of the filler material to be able to incorporate even relatively minor loading (e.g. 15% by weight) thereof material without an adverse effect on the finished article. For example, it is known to treat the filler material to create further reactive sites on the surface thereof.

While use of cast technology can obviate or mitigate the flow-related problems associate with RIM technology, the process is slow relative to RIM or RRIM technology or may be inappropriate to use in certain applications. Moreover, for certain applications, it is known that the polymer structure of a product made using cast technology is inferior to a product made by the use of RIM or RRIM technology.

In light of these difficulties in the prior art, it would be advantageous to have a process for producing an isocyanate-based elastomer which is relatively simple, can utilize a large variety of filler materials and allows for the introduction of substantially large amounts of filler materials without the need for the prior art specialized mixing equipment. It would be especially advantageous if such a process (i) could be adapted to utilize filler materials based on recycled isocyanate-based polymers or elastomers or other post-consumer and post-user products (e.g. tires), and (ii) was not limited by the particle size of the filler material. It would also be desirable if the process were able to obviate or mitigate the disadvantages associated with both cast technology and reaction injection mold technology.

SUMMARY OF THE INVENTION

It is an object of the present invention to obviate or mitigate at least one of the above-identified disadvantages of the prior art.

It is another object of the present invention to provide a process which allows for production of an isocyanate-based elastomer having a substantially high level of filler material incorporated therein.

Accordingly, in one of its aspects, the present invention provides an isocyanate-based elastomer containing a filler material, the filler material being present at a level in the range of from about 30% to about 90% by weight of the elastomer and having a specific gravity of less than about 2.0.

In another of its aspects, the present invention provides a process for producing an isocyanate-based elastomer comprising the steps of:

providing a first mixture comprising a catalyst and a filler material, the filler material acting as a carrier for the catalyst;

providing a second mixture comprising an isocyanate and an active hydrogen-containing compound;

mixing the first mixture and the second mixture to provide a reaction mixture;

allowing the reaction mixture to react to produce the isocyanate-based elastomer.

As used throughout this specification, the term "isocyanate-based elastomer" is intended to mean, inter alia, polyurethane, polyurea and polyisocyanurate.

It has been surprisingly and unexpectedly discovered that by providing a mixture comprising a catalyst and the filler material, the filler material will act as a carrier, i.e. as an adsorbent, for the catalyst, thereby enabling the entire mixture to retain its free flowing nature.

It has been further surprisingly and unexpectedly discovered that when the filler material is pretreated in this manner with the catalyst, and thereafter contacted and mixed with a separate mixture comprising an isocyanate and an active hydrogen-containing compound, an isocyanate-based elastomer may be produced having a substantially uniform distribution of the filler material therein while maintaining a desirable balance of physical properties, even at relatively high levels of filler material.

An aspect of this invention relates to an isocyanate-based elastomer which has an unusually high level of filler material having a relatively low specific gravity. Filler material loading from about 30% to levels as high as about 90% by weight based on the weight of the final elastomer is contemplated. Preferably, the loading of the filler material is in the range of from about 30% to 60% by weight, more preferably from about 30% to about 50% by weight, most preferably from about 30% to about 45% by weight of the elastomer. The specific gravity of the filler material for producing the elastomer in accordance with the present invention is in the range of less than about 2.0, preferably in the range of from about 0.02 to about 1.5. Non-limiting examples of suitable such filler materials include: ground elastomer (filled or untilled), ground sheet molding compound, ground reinforced reaction injection molded (RRIM)

elastomer, ground whole tire or a portion thereof and ground isocyanate-based elastomer foam (foam powder).

DETAILED DESCRIPTION OF THE PREFERRED EMBODIMENTS

The present invention is related to an isocyanate-based elastomer and to a process for production thereof. Preferably, the isocyanate-based elastomer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the elastomer backbone forming linkages have been substituted.

The initial steps in the present process comprise the provision of a first mixture and a second mixture.

The first mixture comprises a catalyst and a filler material. Optionally, the first mixture may further comprise additives conventionally used in the isocyanate-based elastomer art.

The catalyst used in the first mixture is a compound capable of catalyzing the polymerization reaction. Such catalysts are known, and the choice and concentration thereof is within the purview of a person skilled in the art. See for example U.S. Pat. Nos.4,296,213 and 4,518,778, the contents of each of which is incorporated herein by reference. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

The choice of filler material for use in the present process is not particularly restricted provided that the filler material (directly or indirectly) does not substantially poison the polycondensation reaction. Non-limiting examples of filler material include minerals, ores, synthetic materials (both organic and elastomeric), and the like. The process is particularly well suited for use with filler material selected from the group comprising post-consumer and post-user articles - in this scenario these articles may be effectively recycled using the present process. Non-limiting examples of such articles include plastics, tires, and isocyanate-based foams and elastomers (filled and unfilled). Typically the filler material will be used in a particulate, flake or ground form and will have a suitable shape (e.g. microspherical, etc.). The choice of filler material may be dictated by the desired properties of or intended application for the isocyanate-based elastomer product; for example, as follows:

| Filler Material | Application/Property Conferred To Elastomer |
|---|---|
| 1. Fibrous | Porous, breathability, tear, special effects |
| 2. Microspheres | Flotation |
| 3. Expandable beads | Flotation |
| 4. Metallized fibres/powders | Conductivity |
| 5. Carbon black coated flakes/powders | Conductivity |
| 6. Microwave sensitive powders | Thermoformability |
| 7. Metallic fillers | Conductivity |
| 8. Heavy fillers | Sound attenuation |
| 9. Organic salts | Mold releasing |
| 10. Thermosensitive fillers | Thermoformability |
| 11. High aspect ratio fillers | Reinforcement or special effects (e.g. "worm holes") |
| 12. Fillers which are masked carriers for "blowing" or "nucleating" compounds | Foaming, etc. |
| 13. Solid flame retardants | Special applications |

As will be clearly understood by those of skill in the art, the first mixture may comprise one or more conventional additives used in the isocyanate-based elastomer art. Non-limiting examples of such additives include: tensio active agents (e.g. surfactants such as organo-silicone compounds), cross-linkers (e.g. low molecular weight reactive hydrogen-containing compositions), flame retardants (e.g. halogenated organo-phosphoric acid compounds), pigments/dyes, inhibitors (e.g. weak acids), nucleating agents (e.g. diazo compounds), antioxidants, plasticizers/stabilizers (e.g. sulphonated aromatic compounds), extenders (e.g. halogenated paraffins) and desiccants (e.g. molecular sieves). Further, as will be apparent to those of skill in the art, one or more of these additives (e.g. desiccants) may be added to the second mixture in the present process.

The second mixture comprises an isocyanate and an active hydrogen-containing compound.

The isocyanate suitable for use in the second mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g. an alkylene or arylene group). Moreover, Q may be represented by the general formula:

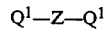

$$Q^1-Z-Q^1$$

wherein $Q^1$ is an alkylene or arylene group and Z is chosen from the group comprising —O—, —O—$Q^1$—, —CO—, —S—, —S—$Q^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention relates to the production of polyurea elastomers, it will be appreciated that in this embodiment, the prepolymer would be used to prepare a polyurethane modified polyurea.

In another embodiment, the isocyanate compound suitable for use in the process of the present invention may be selected from dimers and trimers of isocyanates and diisocyanates, and from elastomeric diisocyanates having the general formula:

[Q"(NCO)$_i$]$_j$ wherein both i and j are integers having a value of 2 or more, and Q" is a polyfunctional organic radical, and-/or, as additional components in the reaction mixture, compounds having the general formula:

L(NCO)$_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a ≡Si—NCO group, isocyanate compounds derived from sulphonamides (QSO$_2$NCO), cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof.

If the process is utilized to produce a polyurethane elastomer, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent No. 1,482,213, the contents of which are incorporated herein by reference. The most preferred polyol is a polyether polyol. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230, a functionality of from 1 to 3. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

It may necessary, in certain circumstances, to utilize a liquid extender when high loadings of filler material are contemplated. The liquid extender may be used in either of the first mixture or the second mixture. Generally, the need to use a liquid extender in the first mixture will be dictated by the amount of filler material loading to be achieved in the final product and the need to maintain the first mixture in a free flowing solid state. Non-limiting examples of suitable liquid extenders include halogenated hydrocarbons, high molecular weight hydrocarbons and active hydrogen-containing compounds (e.g. polyols). Generally, when a liquid extender is used, it will form less than 10 parts by weight.

It is a key aspect of the present process that, in the first mixture, the filler material acts as a carrier for the catalyst (and any other additives present) so that the key components for initiation of polymerization substantially surround the filler material. Specifically, it has been discovered that the use of the filler material as the carrier in this manner results in the ability to separate the prior art single step requirement for both (i) high mechanical mixing efficiency of the filler material with the conventional components; and (ii) the need to obtain intimate mixing (i.e. at the molecular level) of all components prior to completion of polymerization. In the present process, the filler material is initially mixed with all components in the polymerization system except the isocyanate and the active hydrogen-containing compound—i.e. this is the first mixture in the present process—such that the filler material is surrounded essentially by the catalyst and any other additives present. The preparation of the first mixture does not require mixing equipment which is specially adapted to achieve in a single step (i) and (ii) above since polymerization is not occurring. Thereafter the first mixture is contacted with the isocyanate and the active hydrogen-containing compound—i.e. this is the second mixture in the present process—thereby initiating polymerization of the combined mixtures. The result is a process which has a wide processing latitude and is quite versatile. The ability to use a second mixture having a relatively low viscosity facilitates mixing therewith large amounts of filler material of varying nature and/or particle sizes. The increased concentration of additives on the outer surface of the individual particles maximizes the intimate and uniform (both chemical and physical) incorporation of the filler material into the elastomer matrix. Moreover, there is no need for special treatment of the surface of the filler material in order to produce an article having good physical properties indicative of uniform filler material incorporation throughout the polymer matrix. Further, upon combination of the first mixture and the second mixture, the resulting reaction system is characterized by a relatively low initial viscosity having a relatively large degree of flow versatility which provides for a variety in-mold filling applications of the very reactive isocyanate-based elastomer chemistry.

The manner by which the first mixture is mixed with the second mixture is not particularly restricted. It is preferred to mix the first mixture with the second mixture in a conventional low pressure device such as a mechanical stirrer or the like. The resulting blend may then be transferred by conventional means into an open mold. Mold filling may occur due to gravity or the combined effect of the mold lid closing pressure and gravity. Of course, those of skill in the art will appreciate that mold filling techniques employing forces other than gravity may be used in the present process (e.g. centrifugal forces).

It is another key aspect of the present process that the first mixture be in the form of a substantially free-flowing solid (powder or particles). The intent is to achieve mixing of the filler material and a catalyst while maintaining the free-flowing nature of the filler material. This minimizes or eliminates the possibility of agglomeration of filler particles or, at the opposite extreme, the occurrence of wet spots.

It is important that the second mixture comprising the isocyanate and the active hydrogen-containing compound be substantially free of catalytic activity so that any gelling thereof is retarded. The result of this is that the second mixture is a liquid having a viscosity which is sufficiently low that it may be handled relatively easily using conventional equipment.

While not wishing to be bound by any specific theory of mode of action, it is believed that the provision of the first mixture and second mixture prior to production of the isocyanate-based elastomer in accordance with the present invention allows for reduction or elimination of various of the process limitations of prior art processes for introducing filler materials into isocyanate-based elastomers. Specifically, the major reactants in the polymerization reaction are the isocyanate and the active hydrogen-containing compound. For these reactants to react to any appreciable degree at ambient or processable temperatures and conditions, a catalyst is required. When such a catalyst is added, polymerization occurs together with a concurrent increase in viscosity of the reaction mixture. By provision of a first reaction mixture comprising filler material which is substantially wetted with a catalyst, a good elastomer is achieved with thorough mixing of the filler material. In other words, wetting of the filler material surfaces with catalyst ensures that the surface of the filler material serves as the site for polymerization of the reaction mixture. This results in a particularly strong physical bond between the filler and the nascent elastomeric matrix, while facilitating delay of the viscosity increase in the reaction system due to the discontinuous (discrete) nature of the filler material.

Further, the fact that the filler material acts as a "carrier" for the catalyst results in the ability of each filler material particle to have formed around it a layer of elastomer and for self location of the so-coated filler material within the reacting mass. This reduces the amount of mechanical agitation which must be added to the system to distribute the filler material and allows for the use of conventional mixing equipment. The result of this reduction in the amount of mechanical agitation needed is an overall lowering of the free energy in the system which minimizes the occurrence of overheating of the reaction mass and the resultant property degradation associated therewith. Furthermore, the provision of the first mixture in the present process minimizes the occurrence of migration of fugitive components potentially associated with the filler. It is believed that a part or article made from such an elastomer has superior surface quality due to the higher degree of particle "lubrication" by the nascent polymer matrix.

While there are many advantages associated with the isocyanate-based elastomers of the present invention, the salient advantages may be summarized as follows:

1. The ability to utilize a variety of filler materials with a variety of isocyanate-based elastomers. For example, the particle size of the filler materials will usually be dictated by the requirements of the final product, not the processing equipment.
2. There is no need to subject the filler material to special surface treatment to achieve chemical/physical bonding between the filler material and the polymer matrix.
3. The filler material (even those with relatively low specific gravity) may be loaded at various levels ranging from about 30% to about 90% by weight of the isocyanate-based elastomer.
4. By providing filler material particles with an optimal concentration of catalyst therearound, a chemical bond is actually formed between the reactive centers (i.e. toward isocyanate) and the polymer matrix.
5. While the reaction system (i.e. the combination of the first mixture and the second mixture) has relatively low initial viscosity, the overall system reactivity is achieved through the discontinuous nature of the catalyst location on the filler material. By keeping a relatively high concentration of catalyst around the filler material, a segmented polymer structure is contemplated, despite the overall deactivated system.
6. The distribution of the filler material in the polymer matrix is excellent. Although not wishing to be bound by any particular theory or mode of action, it is believed that this may be due to the "self-location" of the filler material in the polymer matrix resulting from a faster rate of reaction around the former. This, of course, would result in an article or product having superior surface quality.

7. It is contemplated that the isocyanate-based elastomer may be produced in a Structural Reaction Injection Molding (SRIM) process which, heretofore, has only been applicable to reactive systems without particulate filler materials.

Further, while there are many advantages associated with the process of the present invention, the salient advantages may be summarized as follows:

1. Separation of the filler material from the isocyanate and active hydrogen-containing compound until it is desired to actually produce the isocyanate-based elastomer results in superior surface quality in the finished product and the ability to tailor the product by incorporating a filler material having specific properties or conferring specific properties to the polymer matrix.
2. The process is readily adaptable to mold filling via gravity only or the combined effect of gravity and pressure created by closure of the mold lid or other forces. Thus, it is actually possible to avoid the use of reaction injection molding techniques including the need to use heavy molds, high clamping pressures and the like.
3. The process is readily adaptable to produce an elastomer having a large surface area and thin cross-section without the need to use extremely high dispenser throughput.
4. The filler material (even those with relatively low specific gravity) may be loaded at various levels up to about 90% by weight of the isocyanate-based elastomer.

Of course, other advantages will be readily apparent to those of skill in the art of isocyanate-based elastomers.

Embodiments of the present invention will now be described with reference to the following Examples which should not be construed as limiting the scope of the invention. The term "pbw" used in the Examples refers to parts by weight.

In the Examples the following compounds were used:
1. T-12, an amine polymerization catalyst commercially available from Air Products;
2. X-8154, an amine polymerization catalyst commercially available from Air Products;
3. B8423, a silicone surfactant commercially available from Th. Goldschmidt;
4. CERECLOR S 52, an inactive extender commercially available from ICI plc
5. VORANOL 48 15, a polyol having a molecular weight of 6000 commercially available from The Dow Chemical Company;
6. Rubiflex 45A, a liquified MDI commercially available from ICI Americas Inc.
7. Diethylene glycol (DEG), a cross-linker;
8. Dipropylene glycol (DPG), a cross-linker;
9. Molecular sieves (4Å), a desiccant.

EXAMPLES 1–4

In these Examples, the mixtures of filler materials shown in Table 1 were used.

TABLE 1

| Filler Material | Filler Material Amount (pbw) | | | |
|---|---|---|---|---|
| | Example 1 | Example 2 | Example 3 | Example 4 |
| Regrinded tire | 90 | 100 | — | 100 |
| Regrinded RRIM | 20 | 40 | 100 | 20 |
| Barium sulphate | 80 | — | — | — |
| Regrinded PVC | — | — | — | 30 |
| Regrinded flexible foam | — | — | 20 | — |

The first mixture comprised filler material (type and amount specified in Table 1), X-8154 (1.0–1.2 pbw), T-12 (0.07–0.1 pbw), DEG (11–14 pbw) and DPG (8–10 pbw). The first mixture was prepared by mixing all of these components in a planetary mixer for approximately 20 minutes.

The second mixture was prepared in a separate vessel and comprised: VORANOL 4815 (100 pbw) pretreated with molecular sieves (5 pbw), Rubiflex 45A in an amount such that the final total (i.e. based on combination of first mixture and second mixture) isocyanate index was 1.05 and CERECLOR S 52 (10 pbw). The second mixture was prepared by blending this components with a suitable mechanical device.

The first mixture and the second mixture were combined and blended together for less than 10 seconds using a hand held mechanical device in an adequately sized vessel, resulting in the production of a homogeneous mass. The homogeneous mass was gravity-filled in an open, flat surfaced, heated (45°–50° C.) and pre-released mold having a lid. The homogeneous mass flowed well and completely filled the mold cavity under pressure exerted by closing the lid immediately after filling of the mold. After approximately 5 minutes, the elastomer product was demolded and had an excellent surface appearance and homogeneous filler distribution in cross-section.

The products from Examples 1 and 4 were subjected to various physical tests, the results of which are reported in Table 2.

TABLE 2

| PHYSICAL PROPERTY | EXAMPLE 1 | EXAMPLE 4 |
|---|---|---|
| Tensile strength (KPa) | 1840.7 | 1088.91 |
| Elongation at break (%) | 146.7 | 113 |
| Tear Strength (N/m) | 11030.89 | 5987.27 |
| Specific Gravity | 0.78 | 0.53 |

Further, the filler loadings of each of the products is provided in Table 3.

TABLE 3

| EXAMPLE | LOADING OF FILLER MATERIAL |
|---|---|
| 1 | 47.3% by weight |
| 2 | 42.0% by weight |
| 3 | 38.1% by weight |
| 4 | 41.4% by weight |

What is claimed is:

1. A process for producing an isocyanate-based elastomer comprising the steps of:
providing a first mixture consisting essentially of a catalyst and a non-cellular filler material, the surface of the filler material being at least partially surrounded by the catalyst to form an available reactive site for polymerization;
providing a second mixture comprising an isocyanate and an active hydrogen-containing compound which are substantially unreacted;

contacting the first mixture and the second mixture to provide a reaction mixture;

wherein said contacting causes substantially immediate reaction of the reaction mixture at the available reactive site to produce the isocyanate-based elastomer.

2. The process defined in claim 1, wherein the active hydrogen-containing compound is selected from polyols, polyamines, polyamides, polyimines or polyolamines.

3. The process defined in claim 1, wherein the active hydrogen-containing compound is a polyol.

4. The process defined in claim 3, wherein the polyol is a hydroxyl-terminated backbone of a member selected from polyether, polyesters, polycarbonate, polydiene or polycaprolactone.

5. The process defined in claim 3, wherein the polyol is selected from adipic acid-ethylene glycol polyester, poly(butylene glycol), poly(propylene glycol) or hydroxyl-terminated polybutadiene.

6. The process defined in claim 3, wherein the polyol is a polyether polyol.

7. The process defined in claim 6, wherein the polyether polyol has a molecular weight in the range of from about 200 to about 10,000.

8. The process defined in claim 1, wherein the active hydrogen-containing compound is a polyamine or a polyalkanolamine.

9. The process defined in claim 8, wherein the polyamine is selected from primary or secondary amine terminated polyethers.

10. The process defined in claim 1, wherein the isocyanate is represented by the general formula:

$$Q(NCO)_i$$

wherein i is an integer of two or more and Q is an organic radical having the valence of i.

11. The process defined in claim 1, wherein isocyanate is selected from 1,6-hexamethylene diisocyanate, 1,4-butylene diisocyanate, furfurylidene diisocyanate, 2,4-toluene diisocyanate, 2,6-toluene diisocyanate, 2,4'-diphenyhnethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates or mixtures thereof.

12. The process defined in claim 1, wherein the isocyanate is selected from 2,4-toluene diisocyanate, 2,6-toluene diisocyanate or mixtures thereof.

13. The process defined in claim 1, wherein the isocyanate is selected from (i) 2,4'-diphenylmethane diisocyanate, 4,4'-diphenylmethane diisocyanate or mixtures thereof; or (ii) mixtures of (i) with an isocyanate selected from 2,4-toluene diisocyanate, 2,6-toluene diisocyanate mixtures thereof.

* * * * *